US008949008B2

(12) United States Patent
Krengiel

(10) Patent No.: US 8,949,008 B2
(45) Date of Patent: Feb. 3, 2015

(54) CONTROL MODULE FOR A VEHICLE

(75) Inventor: Nick Krengiel, Kingston, IL (US)

(73) Assignee: Sexton Partners, LLC, Wilmette, IL (US)

( * ) Notice: Subject to any disclaimer, the term of this patent is extended or adjusted under 35 U.S.C. 154(b) by 270 days.

(21) Appl. No.: 12/855,454

(22) Filed: Aug. 12, 2010

(65) Prior Publication Data

US 2011/0054769 A1  Mar. 3, 2011

Related U.S. Application Data

(60) Provisional application No. 61/233,396, filed on Aug. 12, 2009.

(51) Int. Cl.
| | | |
|---|---|---|
| *G01M 15/00* | (2006.01) | |
| *G06G 7/70* | (2006.01) | |
| *G07C 5/00* | (2006.01) | |
| *B60W 30/188* | (2012.01) | |
| *G07C 5/08* | (2006.01) | |

(52) U.S. Cl.
CPC .............. *B60W 30/188* (2013.01); *G06G 7/70* (2013.01); *G01M 15/00* (2013.01); *G07C 5/00* (2013.01); *G07C 5/0808* (2013.01); *Y02T 10/56* (2013.01)
USPC ........................................... 701/123; 73/1.01

(58) Field of Classification Search
USPC ............... 701/99, 123, 29.1, 29.2, 31.4, 31.5, 701/31.6, 32.7, 33.3, 33.4; 340/539.24, 340/539.3; 700/90; 455/90.1; 60/368; 73/1.01, 1.05, 1.16, 1.19, 1.21, 1.37, 73/35.01, 115.01, 115.02
See application file for complete search history.

(56) References Cited

U.S. PATENT DOCUMENTS

| | | |
|---|---|---|
| 4,056,082 A | 11/1977 | Noiles |
| 4,438,497 A | 3/1984 | Willis et al. |
| 5,355,854 A | 10/1994 | Aubee |
| 5,803,043 A | 9/1998 | Bayron et al. |
| 5,938,716 A | 8/1999 | Shutty et al. |
| 6,151,547 A | 11/2000 | Kumar et al. |
| 6,701,903 B1 | 3/2004 | Collins et al. |
| 6,944,532 B2 | 9/2005 | Bellinger |
| 7,003,393 B2 | 2/2006 | Stevens |
| 7,141,001 B1 | 11/2006 | Albanesi |
| 7,280,905 B1 | 10/2007 | Salvisberg |

(Continued)

FOREIGN PATENT DOCUMENTS

| | | |
|---|---|---|
| DE | 196 33 681 A1 | 3/1998 |
| GB | 2 432 430 A | 5/2007 |

(Continued)

OTHER PUBLICATIONS

"On-board diagnostics," downloaded from Internet May 6, 2009 at http://en.wikipedia.org/wiki/On_Board_Diagnostics (9 pgs.).

(Continued)

*Primary Examiner* — Mark Beauchaine
(74) *Attorney, Agent, or Firm* — Leydig, Voit & Mayer, Ltd.

(57) ABSTRACT

A control module for a vehicle for increasing fuel efficiency can include a controller configured to receive at least one input signal containing at least one vehicle operating parameter and to generate at least one output signal based upon the vehicle operating parameters. The output signal is configured to modify at least one of the operating characteristics of the vehicle.

9 Claims, 5 Drawing Sheets

(56) References Cited

U.S. PATENT DOCUMENTS

| | | | |
|---|---|---|---|
| 7,360,525 B2 | 4/2008 | Yamaguchi et al. | |
| 7,379,801 B2* | 5/2008 | Heffington | 701/29.6 |
| 2003/0182035 A1* | 9/2003 | DiLodovico et al. | 701/35 |
| 2003/0182994 A1* | 10/2003 | Huller et al. | 73/118.1 |
| 2006/0041337 A1* | 2/2006 | Augsburger et al. | 701/1 |
| 2006/0064232 A1* | 3/2006 | Ampunan et al. | 701/115 |
| 2006/0106510 A1* | 5/2006 | Heffington | 701/29 |
| 2006/0260593 A1* | 11/2006 | Anilovich et al. | 123/674 |
| 2008/0221776 A1 | 9/2008 | McClellan | |
| 2008/0270009 A1 | 10/2008 | Spivak | |
| 2009/0240391 A1* | 9/2009 | Duddle et al. | 701/33 |
| 2010/0299020 A1* | 11/2010 | Koepf et al. | 701/29 |

FOREIGN PATENT DOCUMENTS

| | | |
|---|---|---|
| JP | 2007-187072 A | 7/2007 |
| WO | WO 2007/115624 A1 | 10/2007 |

OTHER PUBLICATIONS

"Check Engine, Service Engine Soon light, OBDII engine trouble codes," downloaded from the internet May 6, 2009 at http://www.samarins.com/diagnose/checkengine.html (5 pgs.).

\* cited by examiner

CONTROL MODULE FOR A VEHICLE

CROSS-REFERENCE TO RELATED APPLICATIONS

This patent application claims the benefit of priority to U.S. Provisional Patent Application No. 61/233,396, filed Aug. 12, 2009, and entitled "Control Module For A Vehicle," which is incorporated in its entirety herein by this reference.

BACKGROUND OF THE INVENTION

Rising vehicle fuel costs and increased environmental awareness have driven consumers toward more fuel efficient vehicles. Thus, a need has been created for vehicles which use less fuel and in turn create fewer emissions.

Many new vehicles are designed to maximize fuel efficiency and likewise reduce vehicle emissions. New vehicles, however, can be expensive and investing in a new vehicle can be cost prohibitive to many buyers.

Many devices have been devised to attempt to provide improved fuel efficiency. Often, the primary objective of these devices is to address power concerns with only a secondary function of improved fuel economy. Additionally, many of these devices require significant time, effort, and money to install on an existing vehicle.

Thus, there is a need for an effective means to quickly and easily retrofit any specific type of vehicle to provide the vehicle with improved fuel efficiency and reduced vehicle emissions.

BRIEF SUMMARY OF THE INVENTION

According to the principles of this disclosure, different embodiments of a control module for a vehicle are provided. The control module is adapted to increase the fuel economy of a vehicle to which it is attached. The control module can be configured to receive from the vehicle to which it is attached at least one information signal containing information about at least one vehicle operating parameter. The controller is also configured to generate at least one operating signal based upon at least one information signal received from the vehicle. The controller sends the output signal to the vehicle which modifies at least one of the operating characteristics of the vehicle in response to the operating signal.

The fuel economy controller provides the logic and programming to increase the fuel efficiency of a vehicle to which it is attached. This controller can receive information from the vehicle's existing sensors, programming, and mechanical features from the manufacturer.

In some embodiments, the control module can be connected to the vehicle via the vehicle's on-board diagnostic (OBD) interface, such as an OBD II diagnostic port, for example. In other embodiments, the control module can be adapted to connect to other OBD interfaces. In yet other embodiments, the control module can be connected to the vehicle's on-board computer and/or electrical control unit (ECU) through other connection techniques.

As information is passing to the controller, the controller is adapted to recognize trends in driving where the fuel economizer technology can be applied. Once the opportunity is present, then the controller introduces new programming into the vehicle's stream of information and programming. Once the driving pattern has changed and the opportunity to conserve fuel is no longer present, the vehicle returns to using the factory program until the next opportunity arises. This monitoring cycle can begin as soon as the vehicle is started (provided that the controller is connected) and end when the vehicle is shut down or the controller is removed or turned off.

In some embodiments, a fuel economy controller can include a computer programmable medium adapted to store instructions which when executed perform steps for using the control module to enhance the fuel efficiency of a particular make and model of vehicle. In one arrangement, the fuel economy controller can be connected via any suitable technique (such as a cable or wirelessly) to a purchaser's personal computer equipped with an internet connection. Using the internet connection, the purchaser can communicate with a host internet website. After navigating through a login process, the purchaser can register the purchased fuel economy controller and download an appropriate program for the purchaser's vehicle. The selected program can be written to the computer programmable medium found in the controller.

DETAILED DESCRIPTION OF EMBODIMENTS OF THE INVENTION

Figure 1:
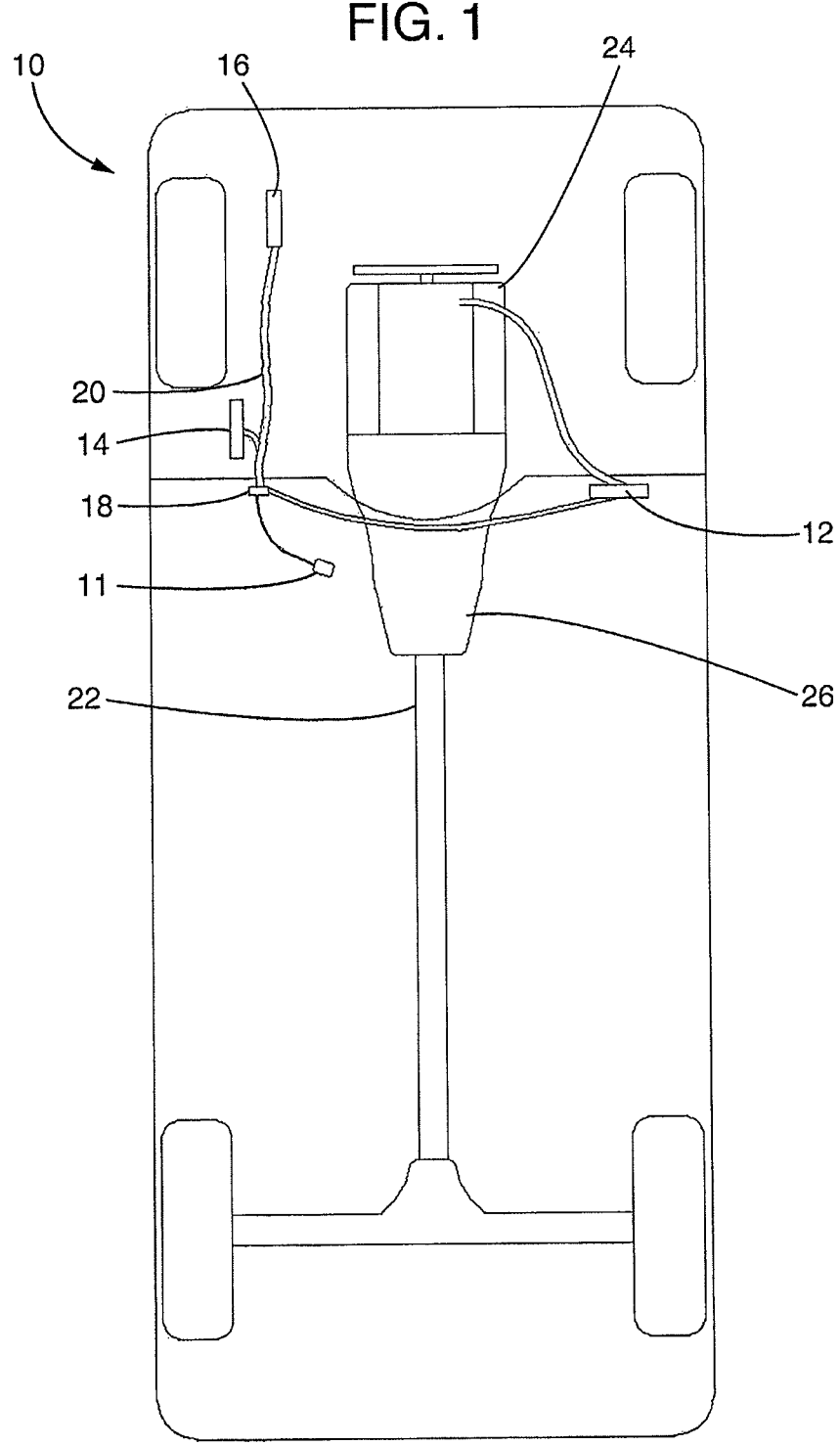
FIG. 1 is a schematic plan view of an embodiment of a vehicle equipped with an embodiment of a control module.

Embodiments of a vehicle engine control module for conserving fuel are disclosed. The control module can be a stand-alone controller that plugs directly into a vehicle's On-board Diagnostics system (OBD II) port as is commonly available on vehicles sold in the United States since 1996. An individual can purchase the fuel economizer controller, download the appropriate program for the vehicle in which the purchaser intends to install the controller, and install the controller in the OBD II port of the vehicle for fuel cost, and environmental impact, reductions. The controller is activated by intuitive technology that reads what the user is requesting the vehicle to perform and identifies when the fuel-saving opportunities arise, thereby providing instant savings. When driving conditions change, the program of the controller will disengage the controller to resume factory preset programming. The use of the controller in a vehicle is accomplished by plugging the controller into a connector in an accessible area under the dashboard of the vehicle, and unplugging the controller when the user wants to remove the control module. In some embodiments, a single control module can be used for more than one vehicle in the event of using or purchasing a different vehicle. Also, in some embodiments, the fuel economizer does not overwrite or install any software to the vehicle to which it is connected.

The fuel optimizer technology utilizes a vehicle's existing sensors and components to provide the vehicle the optimal fuel economy in a variety of situations. The fuel optimizer's computer program continuously monitors the vehicle's operating parameters that include, but are not limited to, parameters relating to systems such as, the engine, the transmission, the brakes and body control operations. When monitoring the vehicle's systems, the fuel optimizer's computer program looks for conditions to optimize the fuel usage of a vehicle in a given circumstance and adjusts at least one operating characteristic in response to identifying the fuel-saving opportunity.

The duration of a fuel-saving condition can vary depending on the time and function(s) that a vehicle is performing. Once the program is activated, it will continue to run, unnoticed by the vehicle's operator, until the driving behavior has changed. Once the behavior changes, the fuel optimizer's program will then return the vehicle to the factory program until another condition has been met for the fuel optimizer to actuate the applicable program.

Once the fuel optimizer's computer program has established that the controller can be applied to save fuel, the program can alter the functionality of one or more of the items listed below:

1. Fuel system (e.g. changing how much fuel is delivered, when it is delivered and to what engine cylinders).
2. Air induction (e.g. changing how much air is delivered, when it is delivered, and to what engine cylinders).
3. Ignition timing (e.g. adjusting for the changes in the air and fuel system).
4. Transmission (e.g. changing internal gear selection through computer programming).

Turning now to the Figures and referring to FIG. 1, a vehicle 10 is shown that is suitable for use with an embodiment of a vehicle control module 11 for increasing fuel efficiency, which is connected thereto. The vehicle includes an Electronic Control Module (ECM) 12, an Anti-lock Braking System (ABS) module 14, a Body Control Module (BCM) 16, and an On-Board Diagnostics (OBD II) port 18. The ECM 12, ABS module 14, and the BCM 16 can be electrically connected to each other via a vehicle bus of any suitable type to provide a vehicle network 20 to facilitate data exchange.

The ECM 12 is adapted to control a drive train 22 of the vehicle that includes an engine 24 and a transmission 26. The ECM 12 is electrically connected to the drive train 22 and the OBD II port 18. The ECM 12 can include an Engine Control Unit (ECU) and a Transmission Control Unit (ECU). The ECM is adapted to send vehicle operating information to the vehicle network 20.

The ABS module 14 is adapted to control the braking system of the vehicle. The ABS module is electrically connected to the OBD II port 18. The ABS module 14 is adapted to send vehicle operating information to the vehicle network 20.

The BCM 16 is adapted to control the operation of other systems of the vehicle, such as, automatic door locks, lights, and warning and operating indicators, for example. The BCM 16 is electrically connected to the OBD II port 18. The BCM 16 is adapted to send vehicle operating information to the vehicle network 20.

The OBD II port 18 is adapted to provide for plug-in access to the vehicle network 20. The OBD II port 18 includes a 16-pin style connector.

The vehicle fuel control module (VFCM) 11 for increasing the fuel efficiency of the vehicle 10 is connected to the vehicle network 20 via the OBD II port 18. The VFCM 11 can be adapted to monitor a plurality of different parts of the vehicle 10 by receiving information from a system of sensors and modules in the vehicle network 20. The VFCM 11 can receive information from any number of the components in the vehicle network 20, including, for example, the ECM 12, the ABS module 14, and the BCM 16.

Figure 2:
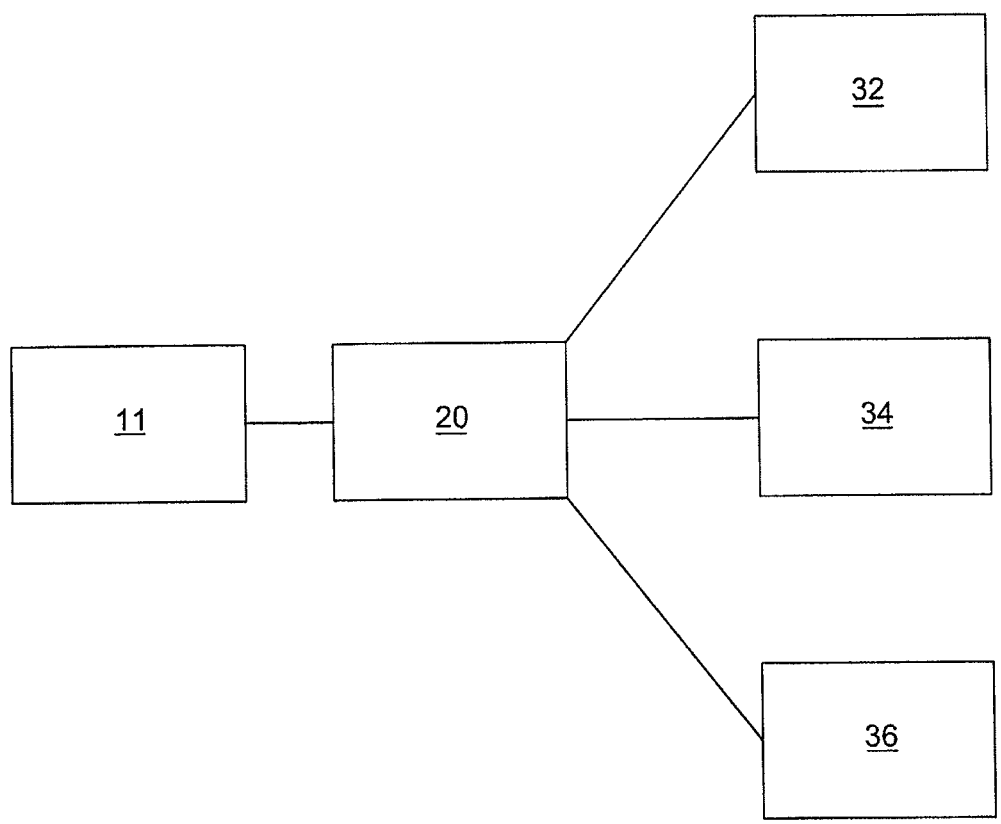
FIG. 2 is a diagrammatic view of components of the vehicle of FIG. 1, illustrating the control module of FIG. 1 connected thereto.

As depicted in FIG. 2, the control module 11 can have a direct data connection with the vehicle's On-Board Diagnostics system or network 20 through the vehicle OBD II port. The control module 11 can be configured to receive information through a vehicle's On-board Diagnostics network 20 from any number of sensors and modules. For example, the control module can be configured to receive information from: (1) engine sensors 32, such as, a throttle body sensor, a crankshaft sensor, and a cam shaft sensor, for example; (2) brake sensors 34, such as, a brake pedal switch, ABS sensors, and a wheel speed sensor, for example; (3) transmission sensors 36, such as, a convertor lockup sensor and a shift solenoid sensor, for example; and (4) a combination of different types of such sensors.

The control module 11 sends an output signal to the vehicle's On-board Diagnostics system 20 but does not change any of the vehicle's computer settings or programming. Rather the control module 11 optimizes the vehicle's operating characteristics and use of fuel in response to current driving conditions based on data received from the vehicle's On-board Diagnostics system 20. The control module 11 can be used to reduce the usage of drive train features and functions which the vehicle wastes unnecessarily.

The control module can optimize fuel usage, for example, by limiting fuel being dispensed from fuel injectors, spark output, and timing adjustments. The data sent to and from the vehicle's On-board Diagnostics system 20 can, for example, be used to construct an appropriate timing application for optimizing fuel usage by reducing engine block cylinder usage as needed in certain sequencing.

The control module 11 can include a computer-readable storage medium for holding a fuel-saving program compiled to write numerous programs to analyze the data being received from the various vehicle sensors and a processor adapted to execute the fuel-saving program contained on the physical computer-readable medium. Once values, sequencing, and timing have been established, the control module can implement a safe and consistent fuel saving program.

In other embodiments the fuel saving program performed by the control module can direct the vehicle's computer or ECM 12 to perform any combination of certain actions. For example, these actions can include, limiting fuel to specific fuel injectors, adjusting the volume of air into the engine, limiting the spark to certain cylinders, adjusting the spark timing.

The program can be executed to perform one or more of the following steps once the control module receives an input signal from the vehicle that meets a predetermined condition:

1. limit fuel to specific fuel injectors sequentially;
2. adjust the volume of air into the engine;
3. limit spark to the adjoining cylinders sequentially;
4. adjust spark timing appropriately to compensate; and/or
5. per each application if available, control the operation of the intake and exhaust valve(s).

The fuel economy controller 11 can constantly monitor all functions of the vehicle to look for opportune times to apply the fuel-saving directions. There are many circumstances when various levels of fuel conservation can be applied. The control module 11 can be adapted to use many different transmission, brake, and body control module values to implement an accurate solution. The adjustment of the vehicle's actual performance is constantly changing. This means, every application and condition is different. Likewise, the solution is also.

The control module 11 can terminate its output signal much like a cruise control system works. When sensors pick up values, similar to a cruise control system when the brake switch is activated, the control module 11 will terminate the program until the next available application arises. The control module 11 can be optimized for any specific type of vehicle.

Figure 3:
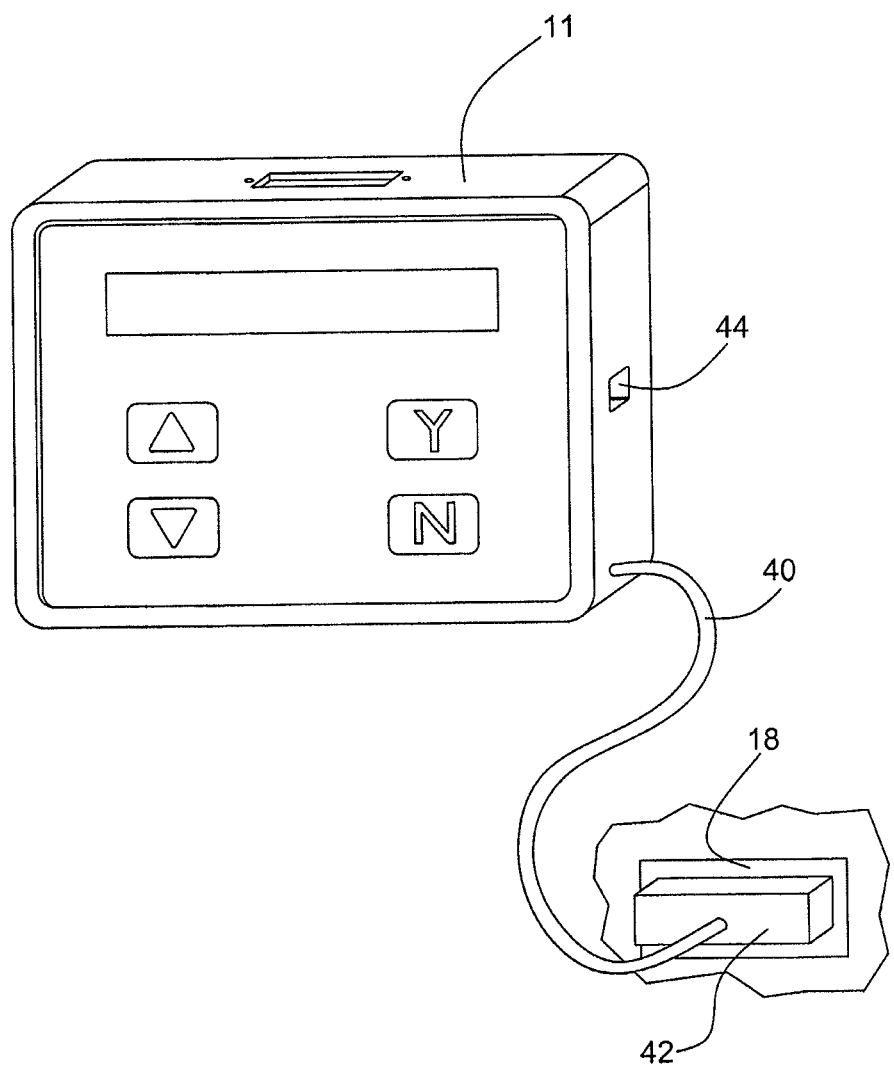
FIG. 3 is an isometric view of an embodiment of a control module for a vehicle.

Referring to FIG. 3, the fuel control module 11 can include a cable 40 with a plug 42 at its distal end that is adapted to connect to the vehicle's OBD II port 18. The fuel control module can be battery-powered. In some embodiments, the power source can be a rechargeable battery. In other embodiments, the fuel control module can include a power cord adapted to connect to a car power outlet.

The control module 11 can include an on-off switch for selective operation of the fuel control module. In other embodiments, the fuel control module can be powered and activated as soon as the vehicle is started (provided that the controller is connected to the vehicle network) and de-energized when the vehicle is shut down or the controller is removed.

The fuel control module 11 can be mounted in any convenient location in the vehicle while maintaining the data connection with the OBD II port 18 via the cable 112. For example, a rear face of the fuel control module can be equipped with one piece of a hook-and-loop fastener. The other piece of the hook-and-loop fastener can be affixed to the dashboard of the vehicle to conveniently removably secure the fuel control module 11 to the dashboard. In yet other embodiments, a socket-type holder can be affixed to the dashboard with the holder adapted to support the fuel control module while allowing access to the operational buttons and display of the fuel control module 11.

Figure 4:
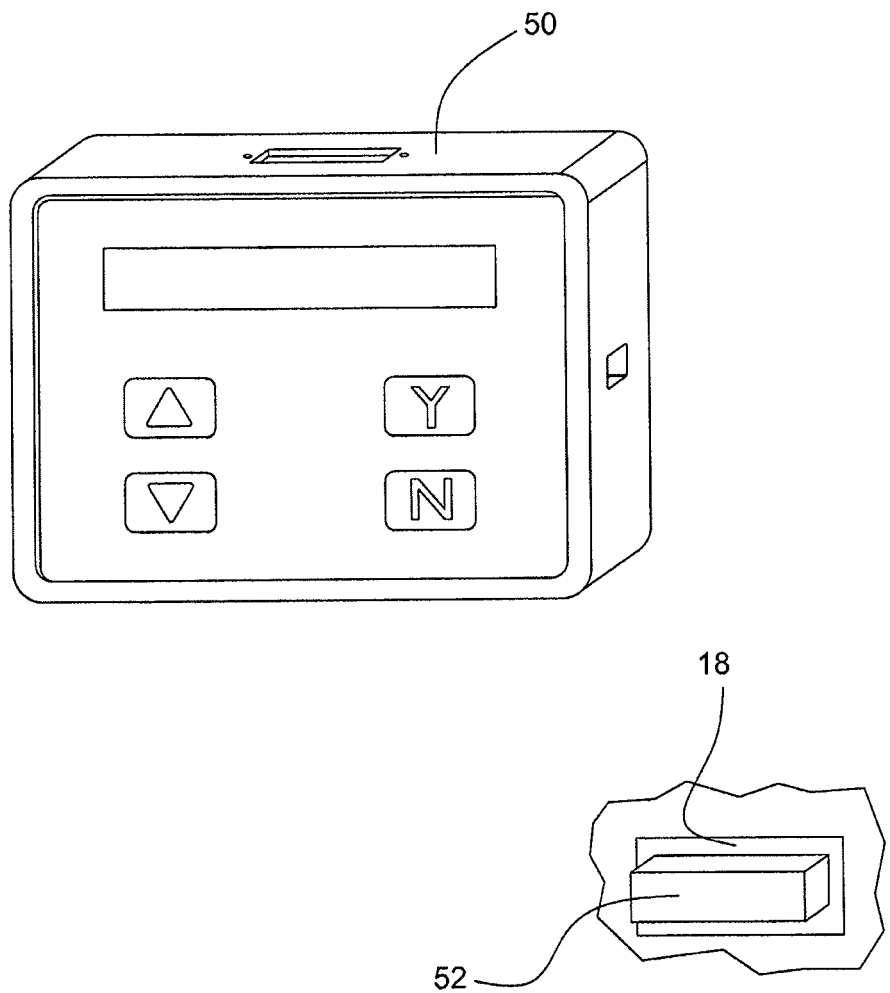
FIG. 4 is an isometric view of another embodiment of a control module for a vehicle in accordance with the disclosure.

In other embodiments, the control module 11 can be connected to the vehicle network 20 via other conventional means. For example, as illustrated in FIG. 4, a fuel control module 50 can be adapted to wirelessly communicate with the vehicle network 20. A transceiver 52 can be connected to the OBD II port 18 and wirelessly transmit and receive data to and from the controller 50 located within a predetermined distance from the OBD II port 18 and to and from the vehicle network to allow the fuel control module 50 to selectively control the vehicle as described above.

The fuel control module 11 can be adapted for use with a plurality of different makes and models of vehicles. In one arrangement, a product website can be established for each individual user to access after purchasing the control module. The user can download the appropriate program for the user's vehicle from the website to a personal computer or directly to the control module 11. The user can be required to perform a registration process before being allowed to download the program for the user's particular vehicle.

Referring to FIG. 3, in one embodiment, the control module 11 can include a port 44 adapted to interconnect the fuel control module 11 and a personal computer, such as a laptop or desktop computer, for example. In one embodiment, the port 44 can be configured as a USB connection. In other embodiments, the control module can include a wireless internet connectivity option (such as a suitable wireless adapter using 802.11 networking standards (i.e. WiFi)).

The fuel control module can include a computer-readable storage medium adapted to be programmed to bear instructions for controlling a predetermined vehicle of a particular make and model to conserve fuel. The fuel control module can be purchased by an individual who can connect the control module 11 to a personal computer, such as a desktop or laptop computer, for example, with an internet connection via the port 44. The purchaser can navigate to a website operated by an administrator of the fuel control module, proceed with a login and/or registration process for the fuel control module, and download an appropriate program for a selected vehicle make and model from the administrator's website to the computer-readable storage medium of the fuel control module 11. Afterward, the purchaser can install the fuel control module 11 on the selected vehicle and use it for fuel conservation. This fuel control module can be re-written such that the module can be used for more than one vehicle in the event of using or purchasing a different vehicle.

Figure 5:
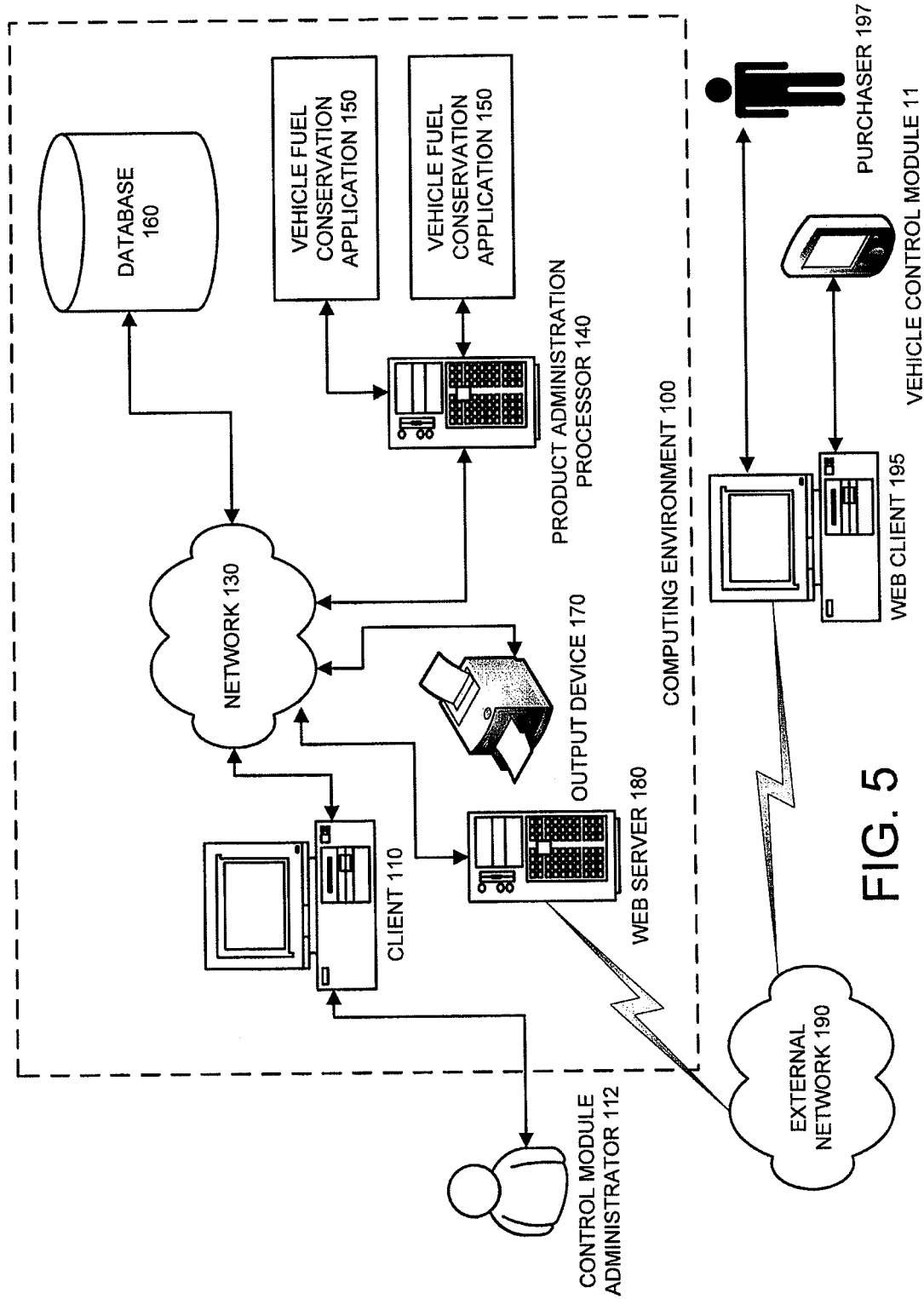
FIG. 5 is a schematic view of an embodiment of a system for administering the customizable use of a fuel control module for a purchaser.

FIG. 5 illustrates an embodiment of a computing environment 100 suitable for administering a product website adapted to allow an individual user to select from a plurality of fuel saving applications adapted for use with different makes and models of vehicles after purchasing a control module. The purchaser can download the desired program for the purchaser's vehicle from the website to a personal computer and then to the control module (via a suitable connection between the personal computer and the control module) or, in other embodiments, directly to the control module. The purchaser can be required to perform a registration process through the product website before being allowed to download the program for the purchaser's particular vehicle.

The computing environment 100 can include a number of computer systems, which generally can include any type of computer system based on: a microprocessor, a mainframe computer, a digital signal processor, a portable computing device, a personal organizer, a device controller, or a computational engine within an appliance. More specifically, the computing environment 100 can include a client 110, an internal network 130, at least one product administration processor 140, a plurality of fuel conservation applications 150, a database 160, at least one output device 170, and a web server 180 operatively connected to an external network 190. The input device 110, the product administration processor 140, the databases 160, the output device 170, and the web server 180 are operatively connected together via the internal network 130.

The client 110 can be used to communicate with a purchaser 197, to enter product registration data into the database 160, and/or to execute the downloading of a selected fuel control application 150 to the purchased fuel control module. The client 110 can comprise at least one input device. The client 110 can generally include any node on a network including computational capability and including a mechanism for communicating across the network. In one embodiment, the client 110 hosts the application front end 120.

The network 130 can generally include any type of wired or wireless communication channel capable of coupling together computing nodes. This includes, but is not limited to, a local area network, a wide area network, or a combination of networks.

The product administration processor 140 can generally include any computational node including a mechanism for servicing requests from a client for computational resources, data storage resources, or a combination of computational and data storage resources. Furthermore, the product administration processor 140 can generally include any system that can be adapted to allow for the selective transmission of one of the fuel conservation applications 150 to the web server 180. The product administration processor 140 can generally include any component of an application that can receive input from the administrator 112 or the purchaser 197, process the input, and present the output to the administrator 112, the client 110, the web server 180, and/or the database 160. The product administration processor 140 can generally include any component of an application that can process data, interact with the database 160, and execute business logic for the administration of the fuel control module.

A report engine can be provided to generate displays of information stored in the database 160 concerning the registered fuel control modules, which can be viewed using the output device 170, for example. In one embodiment, the report engine 150 further provides pre-configured and/or ad hoc reports relating to one or more fuel control modules.

The database or data storage device 160 can generally include any type of system for storing data in non-volatile storage. This includes, but is not limited to, systems based upon: magnetic, optical, and magneto-optical storage devices, as well as storage devices based on flash memory and/or battery-backed up memory.

The database 160 is operatively arranged with the processor 140. In one embodiment, the database 160 contains information for different makes and models of vehicles. This information can be used by the vehicle fuel conservation application 150 selected by the purchaser for a desired vehicle make and model. The database can be arranged to accept the year, make, and model of the vehicle after entering in a serial number of the program to validate purchase and registration.

The information contained in the database 160 includes, but is not limited to, settings and algorithms for the on board computers of various vehicles. These settings and algorithms can be maintained and updated as needed with email updates to registered users.

The output device 170 can comprise a printer, a display monitor, and a connection to another device, for example. The output device 170 can be used to generate reports for sending to the purchaser 197 information about the specific vehicle fuel conservation application 150 downloaded by the purchaser 197. The output device 170 can be used to communicate to the user 112 information about the purchaser 197.

The administrator 112 can generally include: an individual, a group of individuals, an organization, a group of organizations, a computing system, a group of computing systems, or any other entity that can interact with the computing environment 100. In one embodiment, the user 112 can be a client.

The web server 180 can be provided to facilitate the communication of a vehicle fuel conservation application 150 to the purchased vehicle control module 11 from the computing environment 100 to the external network 190. The web server 180 can provide a suitable web site or other Internet-based graphical user interface which is accessible by the purchaser 197, for example. A web client 195 can be connected to the web server 180 through a network connection (e.g., Internet, Intranet, LAN, WAN and the like). The web server 180 can use an authentication server in order to validate and assign proper permissions to authorized users of the system. A permission database can store user credentials and permissions specific to each user. The web server 180 can be outfitted with a firewall such that requests originating from outside the computing environment pass through the firewall before being received and processed at the web server 180.

The selected vehicle fuel conservation application 150 can be downloaded by the purchaser 197 to the purchased vehicle control module without the need for specialized automotive or computer knowledge. The web server 180 can send a prompt to the purchaser 197 to provide step-by-step instructions to finalize installation of the selected vehicle fuel conservation application 150 in the vehicle control module 11.

In addition to the components discussed above, the computing environment 100 can further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

The system can include at least one input device operatively connected to the at least one processor. The system can include at least one output device operatively connected to the at least one processor. The system can include an internal network operatively connected to the at least one processor. The system can include an external network operatively connected to the at least one processor.

Example 1

This example demonstrates a set of data available from a domestic (e.g., General Motors, Ford or Chrysler), two wheel drive, and six-cylinder equipped car that can be used by a control module for a vehicle according to the principles of the present disclosure for improving the fuel efficiency of the vehicle. The data can include engine data, brake system data, and transmission data, for example. The data listed is exemplary in nature. In some embodiments, a subset of these parameters can be monitored. In some embodiments, data from each category can be used. In yet other embodiments, data from a single category can be used.

| ENGINE DATA | |
|---|---|
| H02 SNSR-1 | INJ PW (ms) |
| H02 SNSR-1 | MAF (hz) |
| 02 S1 READY | MAF (gm/sec) |
| ST TRIM % | MAP (kpa) |
| LT TRIM % | MAP (v) |
| POWER ENRICH | BARO (kpa) |
| FT CELL | COOLANT (F°) |
| FT LEARN | INTAKE AIR (F°) |
| DECEL FUEL MODE | START CLNT (F°) |
| FUEL LEVEL % | START IAT (F°) |
| TANK PRS (mmhg) | CYL 1 INJ FAULT |
| AIR PUMP | CYL 2 INJ FAULT |
| AIR SOLENOID | CYL 3 INJ FAULT |
| FP CKT HIS FAULT | CYL 4 INJ FAULT |
| FP CKT FAULT | CYL 5 INJ FAULT |
| HIST EGR FAULT | CYL 6 INJ FAULT |
| CURRENT EGR FAULT | |

| BRAKE SYSTEM DATA | |
|---|---|
| BRAKE SW | LT RR WHL SPD |
| LT FR WHL SPD | RT RR WHL SPD |
| RT FR WHL SPD | |

| TRANSMISSION DATA | |
|---|---|
| TCC SLIP (rpm0) | TRANS FLUID (F°) |
| TCC DUTY (%) | Trans Fluid (v) |
| TCC BRAKE (%) | 1-2 SOLENOID |
| VEH SPEED (mph) | 2-3 SOLENOID |
| PRNDL (A) | COOLANT (F°) |
| PRNDL (B) | PCS DES (amp) |
| PRNDL (C) | PCS ACT (amp) |
| PRNDL (SW) | A/C CLUTCH CMP |
| PCS DUTY (%) | HOT MODE |
| OUTPUT RPM | TCC RELEASE |
| INPUT RPM | GEAR RATIO |
| TCC SOL | RANGE A |
| TRACTION CTRL | RANGE B |
| CC INHIBITED | RANGE C |

-continued

TRANSMISSION DATA

| | |
|---|---|
| CURRENT GEAR | RANGE P |
| IGNITION 1 (v) | ENG TORQ (n-m) |
| SHIFT SELECT SW | CURRENT TAP CELL |
| 1-2 SOL STAT | 2-3 SOL STAT |
| 1-2 SHIFT (sec) | 1-2 ERROR (sec) |
| 2-3 SHIFT (sec) | 2-3 ERROR (sec) |
| 3-4 SHIFT (sec) | 3-4 ERROR (sec) |
| LAST SHIFT (sec) | |

Example 2

A vehicle equipped with a vehicle control module for conserving fuel in accordance with the principles of this disclosure has been parked for a duration met by the fuel optimizer's program. The fuel optimizer's computer program will begin applying a new program that will optimize fuel consumption based on the demands of the vehicle under this specific condition. When the demand changes, the fuel optimizer's computer program will allow the vehicle to return to the factory program.

Example 3

A vehicle equipped with a vehicle control module for conserving fuel in accordance with the principles of this disclosure is driving on the highway. Conditions during a certain duration have been met by the fuel optimizer's program. The fuel optimizer's computer program will begin applying a new program that will optimize fuel consumption based on the demands of the vehicle under this specific condition. When the demand changes, the fuel optimizer's computer program will allow the vehicle to return to the factory program.

Example 4

A vehicle equipped with a vehicle control module for conserving fuel in accordance with the principles of this disclosure is trapped in a traffic back up. Conditions during certain duration have been met by the fuel optimizer's program. The fuel optimizer's computer program will begin applying a new program that will optimize fuel consumption based on the demands of the vehicle under this specific condition. When the demand changes, the fuel optimizer's computer program will allow the vehicle to return to the factory program.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A control module for use in a vehicle having a vehicle network including an on-board computer with programming adapted to control vehicle operating characteristics and collect vehicle operating information, the control module comprising:
    a vehicle network connector adapted to communicatively connect the control module to the vehicle network, the vehicle network connector being adapted to be coupled to an On-Board Diagnostic (OBD) II port in communication with an OBD system;
    a controller in communicative arrangement with the vehicle network connector and adapted to receive at least one input information signal from the vehicle network, the input information signal containing information about at least one vehicle operating parameter, and the controller further adapted to generate at least one output operating signal based upon the at least one input information signal received from the OBD system through the vehicle network and to transmit said output operating signal to the on-board computer through the vehicle network, the output operating signal adapted to modify at least one operating characteristic of the vehicle to reduce fuel consumption without overwriting the programming of the on-board computer of the vehicle.

2. The control module of claim 1, further comprising:
    a computer-readable storage medium adapted to receive a fuel-saver computer program from a product website for a specific type of vehicle, the fuel-saver computer program adapted to analyze said input information signal from the vehicle network to generate said output operating signal;
    wherein the controller is adapted to execute the fuel-saver computer program.

3. The control module of claim 1, wherein the at least one operating characteristic of the vehicle is the amount of fuel to specific fuel injectors.

4. The control module of claim 1, wherein the at least one operating characteristic of the vehicle is the volume of air into the engine.

5. The control module of claim 1, wherein the at least one operating characteristic of the vehicle is the spark timing to certain cylinders.

6. The control module of claim 1, wherein the vehicle network connector includes a transceiver adapted to be connected to the OBD II port, the transceiver adapted to receive the at least one input information signal and wirelessly broadcast the input information signal to the controller, the controller configured to generate the at least one output performance signal and wirelessly broadcast the output performance signal to the transceiver.

7. The control module of claim 1, wherein the at least one operating characteristic of the vehicle is a transmission configuration.

8. A method for controlling at least one vehicle operating characteristic:
- receiving, by a control module connected to an OBD II port of a vehicle, at least one input signal containing information concerning at least one vehicle operating parameter;
- generating, by the control module, at least one output signal based upon the information concerning said at least one vehicle operating parameter;
- transmitting, by the control module, said output signal to a vehicle network of the vehicle without overwriting computer programming of the vehicle;
- wherein at least one of the operating characteristics of the vehicle is modified based upon the output signal.

9. The method of claim 8, further comprising:
- downloading a vehicle fuel conservation program from a product website onto the control module, the vehicle fuel conservation program adapted to interact with at least one predetermined vehicle.

\* \* \* \* \*